United States Patent
Jin et al.

(10) Patent No.: US 8,094,927 B2
(45) Date of Patent: Jan. 10, 2012

(54) STEREOSCOPIC DISPLAY SYSTEM WITH FLEXIBLE RENDERING OF DISPARITY MAP ACCORDING TO THE STEREOSCOPIC FUSING CAPABILITY OF THE OBSERVER

(75) Inventors: Elaine W. Jin, Webster, NY (US); Michael E. Miller, Honeoye Falls, NY (US); Serguei Endrikhovski, Rochester, NY (US); Cathleen D. Cerosaletti, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1539 days.

(21) Appl. No.: 10/789,272

(22) Filed: Feb. 27, 2004

(65) Prior Publication Data

US 2005/0190180 A1 Sep. 1, 2005

(51) Int. Cl.
*G06T 15/10* (2011.01)
(52) U.S. Cl. ............ 382/154; 348/42; 348/51; 359/458; 359/462; 359/466; 396/324; 345/419
(58) Field of Classification Search .................. 382/154
See application file for complete search history.

(56) References Cited

U.S. PATENT DOCUMENTS

| | | | | |
|---|---|---|---|---|
| 4,578,301 A | 3/1986 | Currie et al. | ................... | 428/109 |
| 4,647,965 A | 3/1987 | Imsand | ............................ | 358/88 |
| 4,778,718 A | 10/1988 | Nicholls | ........................ | 428/287 |
| 4,894,270 A | 1/1990 | Nicholls | ........................ | 428/125 |
| 4,899,498 A | 2/1990 | Grieb | .............................. | 52/144 |
| 5,114,653 A | 5/1992 | Schuerhoff et al. | ............ | 264/228 |
| 5,140,415 A | 8/1992 | Choquet | ......................... | 358/88 |
| 5,350,554 A | 9/1994 | Miller | ............................ | 264/171 |
| 5,705,233 A | 1/1998 | Denes et al. | ................... | 427/538 |
| 5,726,704 A | 3/1998 | Uomori | | |
| 5,737,012 A | 4/1998 | Tabata et al. | ..................... | 348/53 |
| 5,891,374 A | 4/1999 | Shah et al. | ..................... | 264/108 |
| 5,902,528 A | 5/1999 | Spragg | ............................. | 264/42 |
| 6,005,607 A | 12/1999 | Uomori et al. | ................... | 348/42 |
| 6,067,192 A | 5/2000 | Lichtenfield et al. | ......... | 359/480 |
| 6,069,192 A | 5/2000 | Shalaby et al. | ............... | 532/205 |
| 6,110,588 A | 8/2000 | Perez et al. | .................... | 428/359 |
| 6,175,379 B1 * | 1/2001 | Uomori et al. | .................. | 348/47 |

(Continued)

FOREIGN PATENT DOCUMENTS

JP 08166559 6/1996

(Continued)

OTHER PUBLICATIONS

Woods et al., "Image Distortion in Stereoscopic Video System," 1993, SPIE, vol. 1915, pp. 1-13.*

(Continued)

*Primary Examiner* — John Lee
(74) *Attorney, Agent, or Firm* — Kevin E. Spaulding

(57) ABSTRACT

A method is provided for customizing scene content, according to a user or a cluster of users, for a given stereoscopic display, including obtaining customization information about the user; obtaining a scene disparity map for a pair of given stereo images and/or a three-dimensional (3D) computer graphic model; and determining an aim disparity range for the user. The method of the present invention also generates a customized disparity map and/or rendering conditions for a three-dimensional (3D) computer graphic model correlating with the user's fusing capability of the given stereoscopic display; and renders or re-renders the stereo images for subsequent display.

15 Claims, 10 Drawing Sheets

U.S. PATENT DOCUMENTS

| | | | |
|---|---|---|---|
| 6,263,574 B1 | 7/2001 | Lubker et al. | 29/897.32 |
| 6,358,575 B1 | 3/2002 | Spragg | 428/34.1 |
| 6,418,610 B2 | 7/2002 | Lubker et al. | 29/525.01 |
| 6,420,024 B1 | 7/2002 | Perez et al. | 428/359 |
| 6,432,347 B1 | 8/2002 | Perez et al. | 264/444 |
| 6,468,451 B1 | 10/2002 | Perez et al. | 264/48 |
| 6,528,151 B1 | 3/2003 | Shah et al. | 428/221 |
| 6,586,073 B2 | 7/2003 | Perez et al. | 428/141 |
| 7,224,357 B2 * | 5/2007 | Chen et al. | 345/420 |
| 2001/0010116 A1 | 8/2001 | Lubker et al. | 29/525.11 |
| 2002/0024516 A1 * | 2/2002 | Chen et al. | 345/419 |
| 2002/0034610 A1 | 3/2002 | Perez et al. | 428/141 |
| 2003/0044592 A1 | 3/2003 | Perez et al. | 428/294.7 |
| 2003/0113018 A1 * | 6/2003 | Nefian et al. | 382/181 |
| 2003/0176593 A1 | 9/2003 | Bordes et al. | 525/419 |
| 2003/0197779 A1 * | 10/2003 | Zhang et al. | 348/14.16 |
| 2004/0189720 A1 * | 9/2004 | Wilson et al. | 345/863 |
| 2004/0193413 A1 * | 9/2004 | Wilson et al. | 704/243 |

FOREIGN PATENT DOCUMENTS

| | | |
|---|---|---|
| JP | 09201472 | 8/1997 |
| WO | WO 03/000122 A1 | 1/2003 |

OTHER PUBLICATIONS

Dhond et al., "Stereo matching in the presence of narrow occluding objects using dynamic disparity search," IEEE, vol. 17, pp. 719-724.*

Drivers for Windows "NVIDIA 3D Stereo User's Guide" (for Detonator XP), Revision 2.0. NVIDIA Corporation, Nov. 8, 2001.

*Binocular vision and stereopsis* by Ian P. Howard and Brian J. Rogers, 1995. Chapter entitled "The limits of stereoscopic vision", p. 159.

"Image Distortions in Stereoscopic Video Systems" by Andrew Woods, Tom Docherty, and Rolf Koch. *Proceedings of the SPIE,* vol. 1915, Stereoscopic Displays and Applications IV, pp. 1-13, 1993.

* cited by examiner

Optometric parameters:

☐ 512 Interpupillary distance (mm)
☐ 514 Near testing distance (m)
☐ 516 Distant testing distance (m)
☐ 518 Near phoria (prism diopters)
☐ 520 Distant phoria (prism diopters)
☐ 522 Near base-out fusional reserve (prism diopters)
☐ 524 Near base-in fusional reserve (prism diopters)
☐ 526 Distant base-out fusional reserve (prism diopters)
☐ 528 Distant base-in fusional reserve (prism diopters)

STEREOSCOPIC DISPLAY SYSTEM WITH FLEXIBLE RENDERING OF DISPARITY MAP ACCORDING TO THE STEREOSCOPIC FUSING CAPABILITY OF THE OBSERVER

FIELD OF THE INVENTION

The invention relates generally to the field of displays, and in particular to stereoscopic display systems. More specifically, the invention relates to a stereoscopic display system that provides a customized rendering for groups of similar individuals or each individual user.

BACKGROUND OF THE INVENTION

The normal human visual system provides two separate views of the world through our two eyes. Each eye has a horizontal field of view of about 60 degrees on the nasal side and 90 degrees on the temporal side. A person with two eyes, not only has an overall broader field of view, but also has two slightly different images formed at her two retinas, thus forming different viewing perspectives. In normal human binocular vision, the disparity between the two views of each object is used as a cue by the human brain to derive the relative depth between objects. This derivation is accomplished by comparing the relative horizontal displacement of corresponding objects in the two images.

Stereoscopic displays are designed to provide the visual system with the horizontal disparity cue by displaying a different image to each eye. Known stereoscopic displays typically display a different image to each of the observers' two eyes by separating them in time, wavelength or space. These systems include using liquid crystal shutters to separate the two images in time, lenticular screens, barrier screens or auto-stereoscopic projection to separate the two images in space, and the use of color filters or polarizers to separate the two images based on optical properties.

Unfortunately, the visual information provided by a stereoscopic display differs in many ways from viewing real world objects. This difference in visual information or visual cues often leads to user discomfort or the inability to fuse the two images (i.e., to perceive the two images displayed to the two eyes as one fused image rather than two separate images). One of the important differences between the visual information provided by most prior art stereoscopic display systems and the real world environment arises from the fact that the user of these displays must accommodate, or focus, at a single plane in space when viewing a stereoscopic display while the disparity cues that are provided indicate that the objects are at different planes in space. This differs from the real world visual environment where the accommodative and disparity cues provide consistent information. This is a very important difference since the vergence of our eyes and their accommodation distance are reflexively linked, often causing accommodation distance to track convergence distance as the two eyes converge to place an important object onto the fovea of each eye.

Another important difference is that stereoscopic display systems have the ability to augment the disparity cues, providing larger amounts of disparity information than actually exists in the real world. This provision can provide a greater sense of depth and greater perceived separation of objects in an image. This can be particularly important in detection or identification tasks, where it is important to separate a target (e.g., a cancerous lesion, a surveillance threat, or a potential rescue victim) from a complex background. Unfortunately, when this disparity becomes too large, users of stereoscopic display systems often experience discomfort.

It is well understood that there is an upper limit for how much disparity the human brain can fuse (see *Binocular Vision and Stereopsis*, Chapter entitled "The limits of stereoscopic vision" by Howard and Rogers, p. 159, 1995). It is also well understood that some individuals are not able to interpret stereoscopic information and therefore are unable to benefit from the cues provided by a stereoscopic display system. It is understood to a lesser degree, however, that there is significant individual variability in observers' ability to comfortably fuse two images that have horizontal disparity.

In the field of psychology, it has been demonstrated that the fusional range that is common to all users is much smaller than that for some individual users (see ref. "Image distortions in stereoscopic video systems" *Proceedings of the SPIE*, Volume 1915, Stereoscopic Displays and Applications IV, by Andrew Woods, Tom Docherty, and Rolf Koch, pp. 1-13, 1993). This research finding is supported by research in the field of optometry, where a method of quantifying the range of convergent and divergent angles that each individual is able to fuse has been applied to understand an individual's visual performance. It is well understood that this range of convergent and divergent angles that can be fused, referred to as an individual's fusional reserve, differs from individual to individual and differs with differences in the accommodative stimulus that is provided. Importantly, research in this field has shown that some individuals can fuse a large range of convergent angles and a small range of divergent angles while other individuals can fuse larger ranges of divergent angles than convergent angles. Because of this individual variability, if a stereoscopic system is developed to provide comfortable stereoscopic images to all users, the range of disparity that can be shown will be extremely limited.

In the field of stereoscopic display it has been realized that a stereoscopic display system cannot provide high quality, comfortable horizontal disparity information unless the system takes into account the limitation set by the human binocular system. U.S. Pat. No. 4,647,965 describes a stereoscopic imaging system that has the ability to adjust the horizontal positions of the corresponding objects in the stereoscopic pair to provide quality and viewing comfort for viewing three-dimensional content. The system consists of image capture, image digitization, image processing, and digital to analog conversion. The image-processing algorithm identifies corresponding objects in the stereoscopic pair, and shifts the objects in one of the two images to reduce the disparities between the views. However, this system does not provide a means for determining an individual's ability or for clustering an individual into a group of individuals that may have similar visual performance. Further, image display as described in this display is performed through analog media that can not be altered for each individual and therefore the images produced by this system cannot be rendered for users of different ability and therefore to be successful this system must reduce the maximum disparity to the small range that all observers can comfortably fuse or accept the fact that some percentage of users will experience discomfort while viewing these stereoscopic images.

U.S. Pat. No. 6,175,379B1 discusses a computer graphics driven stereoscopic display system which also provides a customized rendering for different viewing conditions. Specifically, the system alters the rendering camera separation, focal length, and/or distance from objects in the scene as a function of the viewing conditions that include the display size, viewing distance, and resolution. The intent of this patent is to render stereoscopic information that can be comfortably viewed by all users. As described in this patent, computer graphics experts decide on the acceptable range of disparities that can be fused by all users when rendering the computer graphics scene. Image content outside the fusional area are clipped from view or their contrast and/or focus are reduced to make them unusable. Once again, this system does not provide a means for determining an individual's ability and the output of this system uses analog media that cannot be altered for each individual user who has a different ability.

User comfort has also been considered in commercial products such as the NVIDIA 3D stereo driver. This driver can generate and display a stereoscopic image pair from one computer generated image with embedded depth information about the computer generated graphic objects. This driver comes with a number of controls for use in stereo game playing, including stereo separation adjustment to suit individual adaptation to stereo viewing, hot keys for in-game stereo control, stereo test process for determining the best screen mode to use, and custom game configurations that tailor the stereo process to a wide range of games. This product provides the technical capability to adjust the range of disparity for a range of stereoscopic scenes. However, this system does not provide a method to link the capability of individual users to fuse stereoscopic images to the stereoscopic rendering process. As a result, the viewing comfort can only be achieved by the dynamic adjustment during viewing. Considering that in a game-playing environment the range of disparity may vary significantly from scene to scene, the dynamic nature of the adjustment can be a challenging task for the users. Furthermore, the optimization between viewing comfort and good stereoscopic perception cannot be achieved by a method of dynamic adjustment such as the one provided by NVIDIA as it does not consider the actual range of disparities present in any scene.

There is a need, therefore, for creating an adaptive stereoscopic display system that can obtain and utilize the knowledge of the stereo capability of the user to enhance the rendering of stereo images.

SUMMARY OF THE INVENTION

The present invention is directed to overcoming one or more of the problems set forth above. According to one aspect of the present invention, a method is provided for customizing scene content, according to a user or a cluster of users, for a given stereoscopic display, including obtaining customization information about the user; obtaining a scene disparity map for a pair of given stereo images and/or a three-dimensional (3D) computer graphic model; and determining an aim disparity range for the user. The method of the present invention also generates a customized disparity map and/or rendering conditions for a three-dimensional (3D) computer graphic model correlating with the user's fusing capability of the given stereoscopic display; and re-renders the stereo images for subsequent display.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 8 is an example user interface for inputting optometric data.

FIG. 12($b$) is a plot showing a second method of performing the mapping from input disparity to output disparity that may be employed in the practice of the present invention.

FIG. 12($c$) is a plot showing a third method of performing the mapping from input disparity to output disparity that may be employed in the practice of the present invention.

To facilitate understanding, identical reference numerals have been used, where possible, to designate identical elements that are common to the figures.

DETAILED DESCRIPTION OF THE INVENTION

The present description is directed in particular to elements forming, part of, or cooperating more directly with, apparatus in accordance with the invention. It is to be understood that elements not specifically shown or described may take various forms well known to those skilled in the art.

The present invention is directed towards a stereoscopic imaging system in which display attributes and knowledge of user's binocular visual performance are applied to improve the comfort and the quality of the viewing experience. This invention is based on the research results by the authors where a link between the optometric measurement and the stereo fusing capability is established. This system utilizes knowledge of the display attributes and user's binocular visual performance to determine rendering parameters for the stereoscopic information. These rendering parameters are used to provide a customized presentation of information on the display device for a group or a specific human observer. These rendering parameters may be used to select among various segments of pre-rendered content or are used to render left and right eye views to the observer in a way that improves the viewing experience. This improvement in viewing experience will often result in increased user comfort or enhancing the quality of the viewing experience in terms of increasing user enjoyment, engagement or presence. This improvement may also be linked to the improvement in the performance of the user during the completion of a task.

Figure 1:
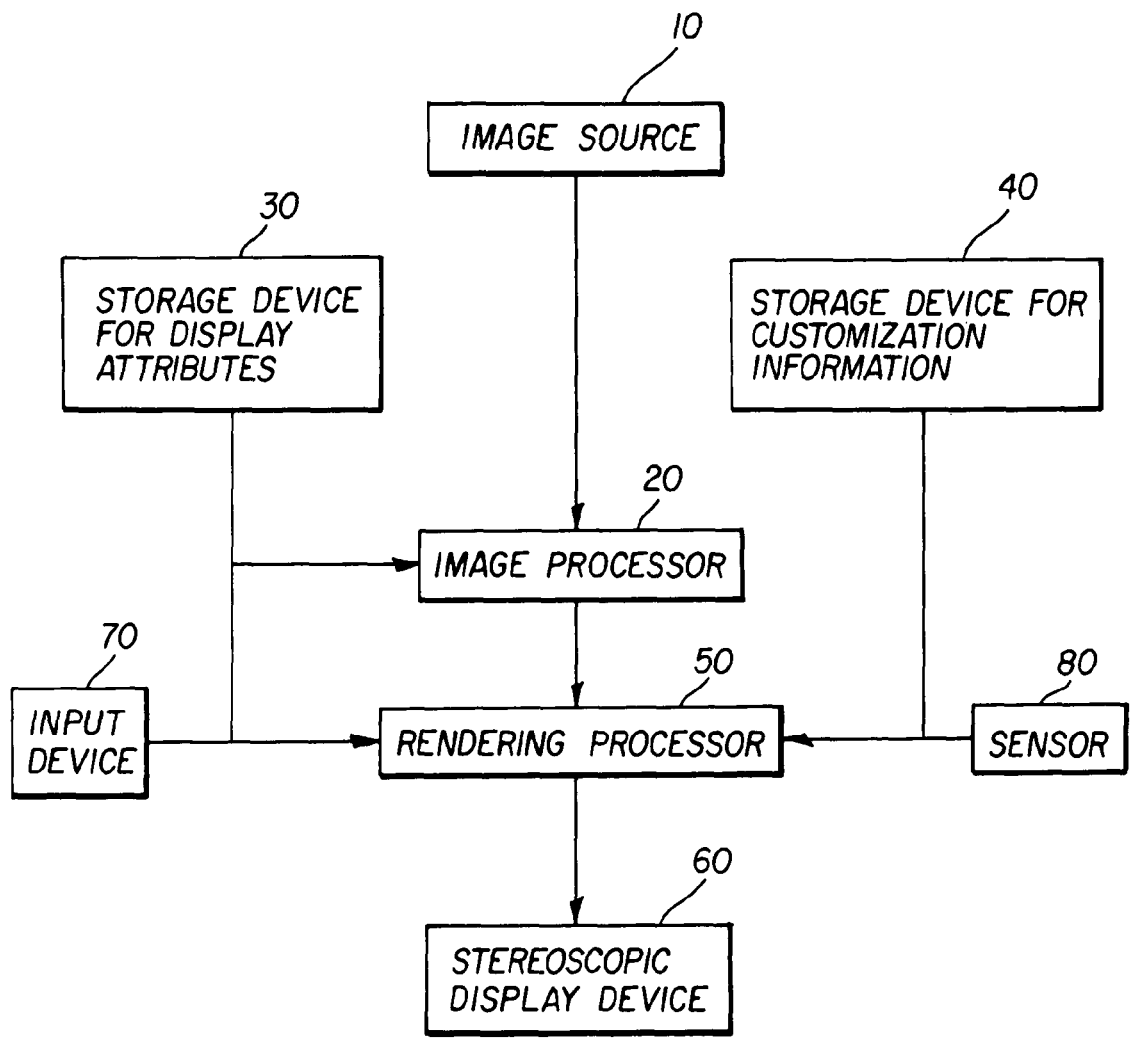
FIG. 1 is a diagram of the system employed in the practice of the present invention.

A system of the present invention is shown in FIG. 1. The system of the present invention includes an image source 10 for obtaining stereoscopic image information or computer graphics models and textures, an optional image processor 20 for extracting a disparity map from the image source, a storage device 30 for storing display attributes, a storage device 40 for storing customization information, a rendering processor 50 for generating a customized disparity map, and rendering the stereoscopic information based on this map, and a stereoscopic display device 60 for displaying the rendered stereoscopic pair of images. This system can optionally have an input device 70 that takes feedback from the user that may be used to assess the user's binocular visual performance, or to set the rendering intent, or to provide means for user interaction with the system during viewing (e.g. indicating the region of interest). It may also optionally have a sensor 80 that monitors the characteristics of the user including the head position, eye gaze direction, and accommodation state of the eye.

The image source 10 may be any device or combination of devices that are capable of providing stereoscopic image information. For example, this image source may include a pair of still or video cameras capable of capturing the stereoscopic image information. Alternately, the image source 10 may be a server that is capable of storing one or more stereoscopic images. The image source 10 may also consist of a memory device capable of providing definitions of a computer generated graphics environment and textures that can be used by the image processor to render a stereoscopic view of a three dimensional graphical environment.

The optional image processor 20 may be any processor capable of performing the calculations that are necessary to determine the disparity between a pair of stereoscopic images that have been retrieved from the image source 10. For example, this processor may be any application specific integrated circuit (ASIC), programmable integrated circuit or general-purpose processor. The image processor 20 performs the needed calculation based on information from the storage device for display attributes 30 as well as information from the image source 10.

The storage device for display attributes 30 may be any storage device that is capable of storing information regarding the characteristics of the display device. This storage device may be, for example, an electronically programmable read only memory (EPROM) that is embedded in the display itself or on a video card. Alternatively, it may be storage that is available on a local or network based computer disk such as a hard drive, CD. This storage device will store information for the display device such as the resolution, size of display, point of optical convergence, and plane of accommodative focus for retrieval and use. This storage device will also store viewing environment characteristics, such as the nominal observer viewing distance.

The storage device for customization information 40 may be any memory device that is capable of storing information regarding the characteristics of the user. This storage device may be, for example, an electronically programmable read only memory (EPROM) that is embedded on a video card. Alternatively, it may be a storage device that is available on a local or network based computer disk such as a hard drive, compact disk, or solid-state memory. Alternatively this storage device will include a means to obtain the stereo capability of the user using a computer program. This storage device will store information for the user such as the capability of convergence/divergence, phoria, capability of accommodation, range of fusion. This storage device will also store the rendering intent, as specified by the user. The storage device 30 and 40 may be two separate devices, or may be the same device.

The rendering processor 50 may be any processor capable of performing the calculations that are necessary to determine the customized disparity map for a specific user and specific scene content and to render the graphical or scene information using this disparity map. The calculation is based on the inputs from image processor 20, storage device for display attributes 30, and storage device for customization information 40, input device 70, and sensor 80. The rendering processor 50 and the image processor 20 may be two separate devices, or may be the same device.

The stereoscopic display device 60 may be any display capable of providing a stereoscopic pair of images to a user. For example, the stereoscopic display device 60 may be a direct view device that presents an image at the surface of the display (i.e., has a point of accommodation and convergence at the plane of the display surface); such as a barrier screen Liquid Crystal display device, a CRT with liquid crystal shutters and shutter glasses, a polarized projection system with linearly or circular polarized glasses, a display employing lenticules, a projected auto-stereoscopic display, or any other device capable of presenting a pair of stereographic images to each of the left and right eyes at the surface of the display. The stereoscopic display device 60 may also be a virtual image display that displays the image at a virtual location, having adjustable points of accommodation and convergence, such as an auto-stereoscopic projection display device, a binocular helmet-mounted display device or retinal laser projection display.

The optional input device 70 may be a mouse or a keyboard that are capable of taking input from the user. It may also be a multi-modal device that takes input from the user via eye tracking, by voice, or by tactile action.

The optional sensor 80 may be any tracking device that can detect the position of the head or the gaze direction of the eyes. For example, it can be two cameras that sense the head position, and hence is able to determine the distance between the head and the display screen.

Figure 2:
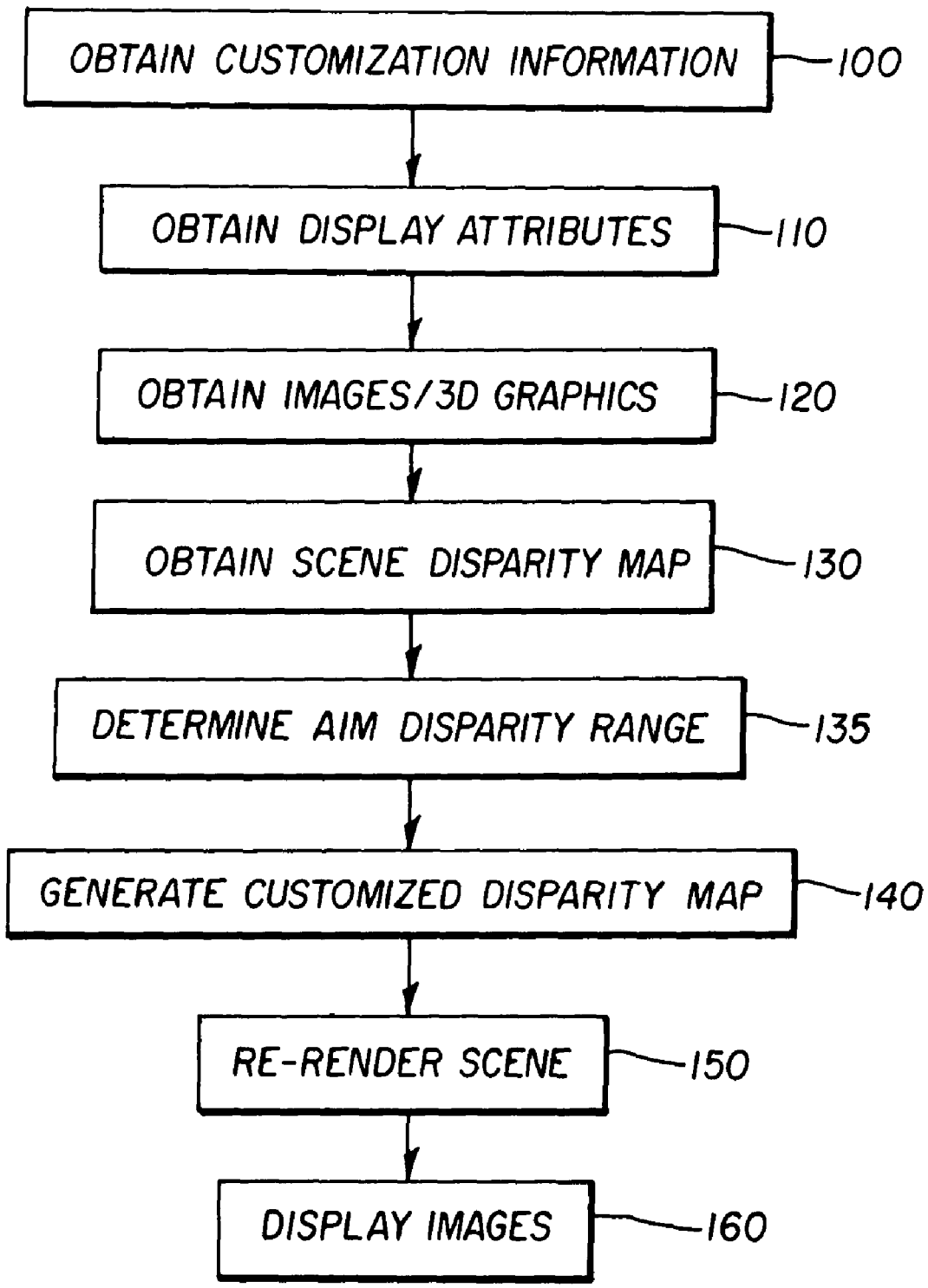
FIG. 2 is a flow chart showing the steps of the method of the present invention.

FIG. 2 is a flow chart depicting a method for implementing this invention. Customization information is obtained in step 100. Display attributes are obtained in step 110. Stereoscopic imagery or 3-D graphical models and textures are obtained in step 120. From this imagery or 3D graphical model data a scene disparity map is extracted in step 130. In step 135 an aim disparity range is determined based on the customization information and the display attributes. A remapping is completed in step 140 where a customized disparity map is generated. The stereoscopic scenes are re-rendered in step 150, and then displayed in step 160.

The customization information obtained in step 100 includes a user profile and/or a rendering intent. The user profile defines the stereo fusing capability of an individual user as a function of the accommodation state. It also contains a unique user identifier. The rendering intent may include items such as the level of skill and the type of task to be performed.

Figure 3:
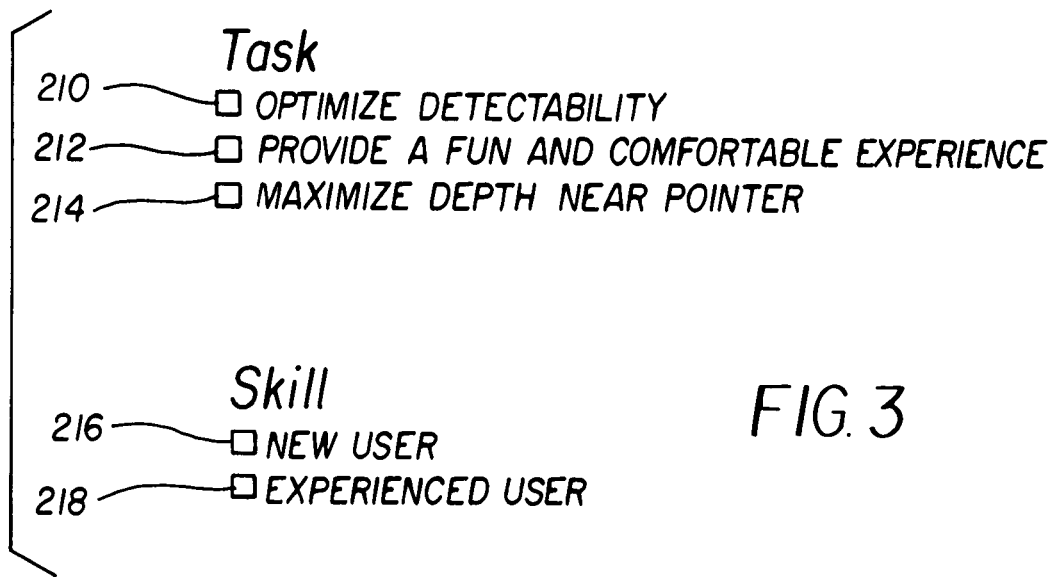
FIG. 3 shows an example user interface screen for inputting rendering intent.

FIG. 3 shows options that may be depicted in an example user interface screen and presented to the user or a system administrator to input the rendering intent. The rendering intent includes task related options as shown in FIG. 3, such as "optimize detectability" 210, "provide a fun and comfortable experience" 212, or "maximize depth near the pointer" 214. The rendering intent may also include skill related options, such as "new user" 216 or "experienced user" 218. The input device 70 may be used to select and confirm an option among these options. Menus of the type shown in FIG. 3 may be employed to determine any of the items that may be used to determine the rendering intent. Once the user selects an option from any of these menus, their selection may be stored in the storage device for customization information 40 to be retrieved for future use based on the user identifier.

Figure 4:
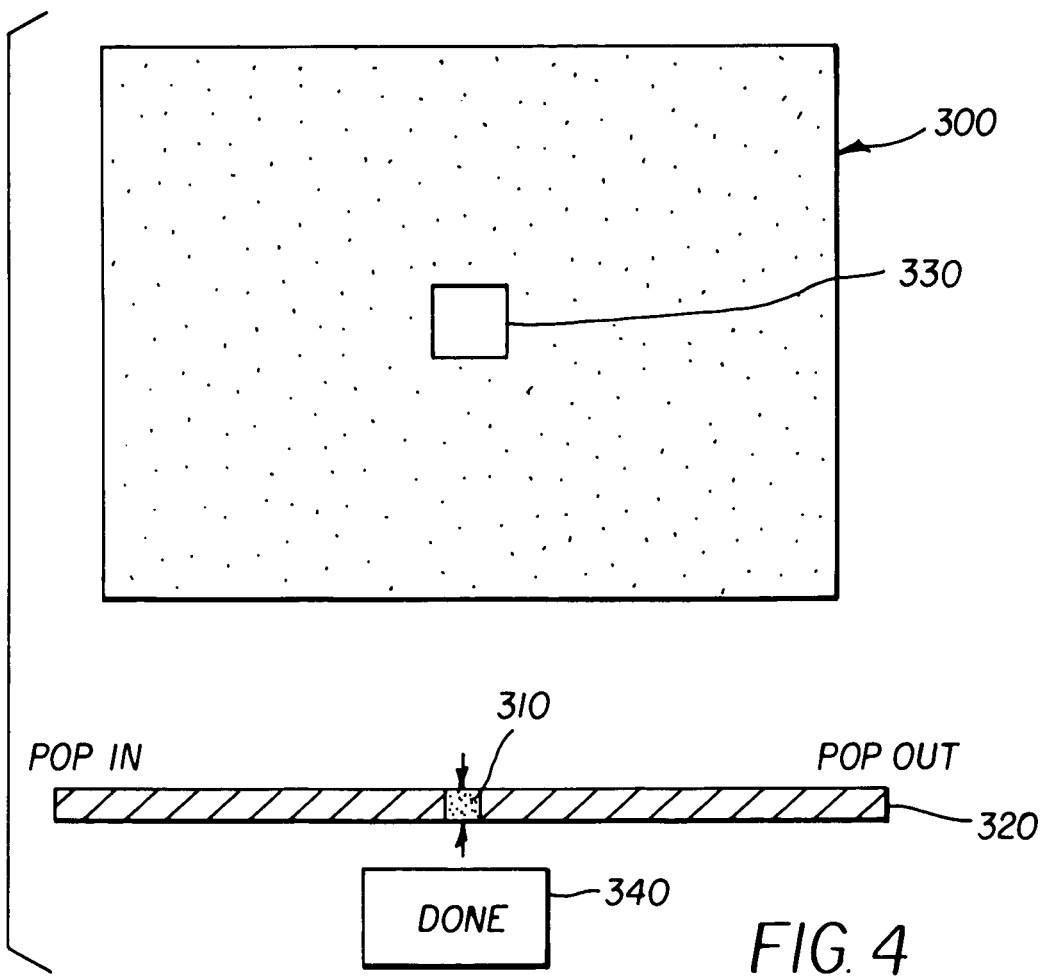
FIG. 4 is an example graphical user interface for on-display measurement of user stereo fusing capability.

FIG. 4 depicts a graphical user interface for a software application that can be used to assess the user's stereo fusing capability on the same display system. Here the input device 70 is assumed to be a mouse. At the beginning of the test session, the slider marker 310 is in the middle of the slider bar 320. There is no horizontal disparity for the test stimulus 330, and the user should see the test stimulus 330 as having the same depth as the background 300. Then the user starts to move the slider marker 310 to the right. This movement increases the crossed disparity of the test stimulus 330 so that it appears to pop out towards the user relative to the background 300. At some point the test stimulus 330 would no longer be fusible. This indicates the upper limit of the Fusional Range for Crossed Disparity (FRCD). The user would click button 340 'Done' to record this range, and the system is reset to the original state, i.e. the slider marker 310 is back to the middle of the slider bar 320, and the test stimulus 330 resides in the same depth plane as the background 300. The limit of the Fusional Range for Uncrossed Disparity (FRUD) is recorded similarly with the slider marker 310 being moved to the left.

Several alternative user interfaces may similarly be designed. For example, the display may show a test stimulus 330 with a larger disparity than anyone can be expected to fuse and the slider marker 310 can be used to decrease the disparity until the user is able to fuse the target at which time they can press the button 340 'Done'. In another embodiment, rather than having the user manually manipulate the fusional range of the test stimulus 330 by moving the slider marker 310, the computer may automatically adjust the disparity of the target and the user may simply press the button 340 'Done' whenever they are or are not able to fuse the target. In yet another embodiment, the user interface may display a plurality of test stimulus 330 having a range of disparities and the user may simply indicate the test stimulus with the largest disparity that they are able to fuse. It is also understood that some display systems may allow some pixels to have a different focal distance than other pixels and therefore some of the test stimulus 330 used within the user interface may have a different focal distances. Through showing a number of the user interface screens in which focal distance and disparity are changed independently of one another, a profile may be built which indicates the fusable disparity as a function of focal distance for each observer. In yet other embodiments of the user interface, the user may be asked to provide a rating or other number associated with their perception of their psychophysical response to the test stimulus 330. For example, the user may be shown one or more test stimuli 330 and asked to indicate their comfort when viewing this test stimuli by entering a number corresponding to their comfort into a data entry field and then pressing the button 340 'Done' to indicate that the response has been correctly entered.

Figure 5:
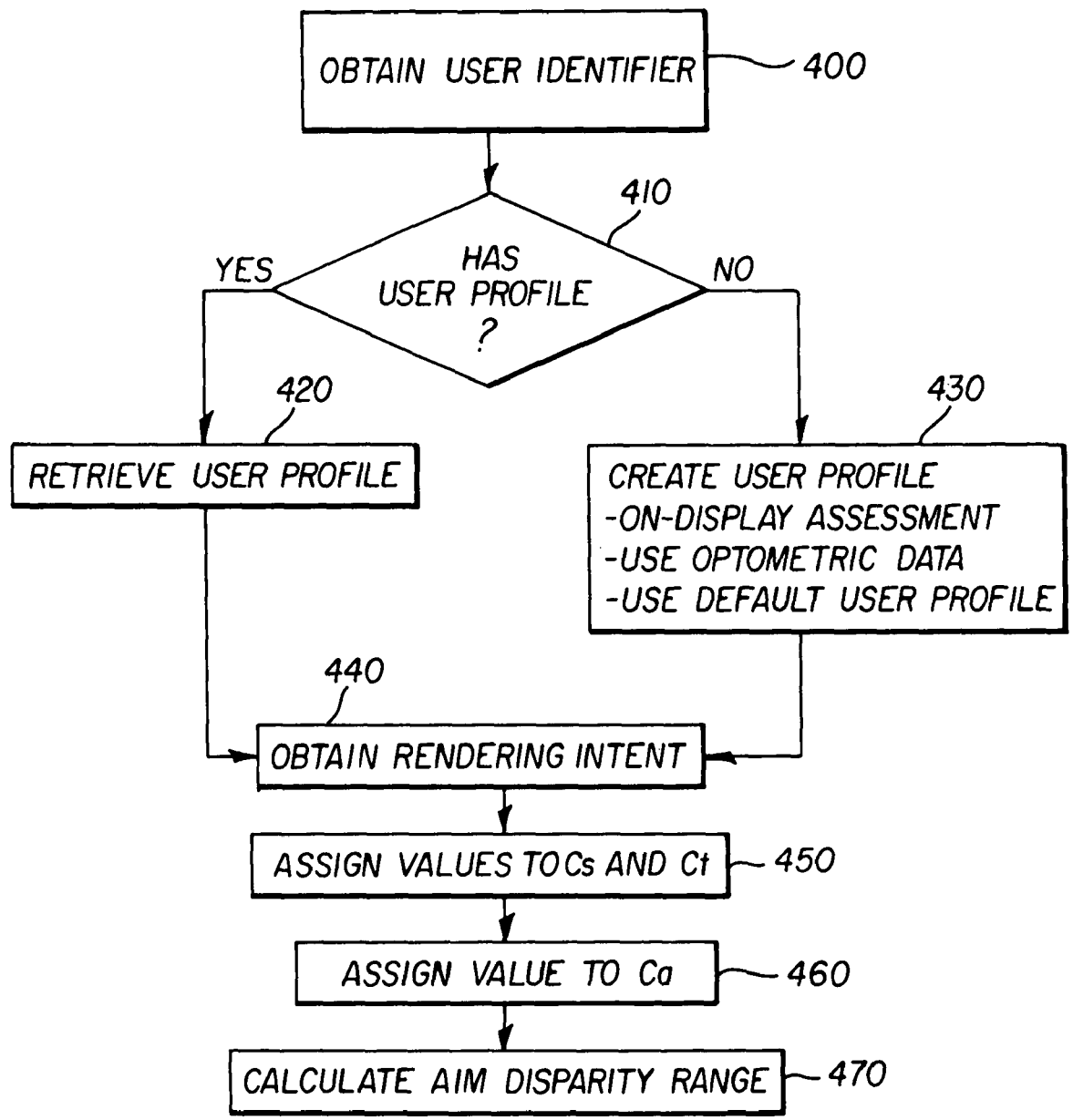
FIG. 5 is a flow chart showing the steps of determining the aim disparity range using customization information.

FIG. 5 shows the steps taken to determine the aim disparity range, as described in step 135 of FIG. 2. First, the system obtains a user identifier in step 400 using input device 70. In step 410 the system determines if the user profile is existent or is new. If the user identifier is linked to an existing user profile, the user profile will be retrieved in step 420. If the user identifier is new, the system would offer options to obtain the user profile in step 430. There are three options to obtain this user profile. It can be obtained using the same display device with a computer program, as illustrated in FIG. 4. It can also be obtained offline using optometric assessment, and then the data may be input into the system. Lastly, it can be a default user profile that is stored in the storage device for customization information 40. Details of the latter two methods will be discussed in future sections. In step 440 a rendering intent is obtained from the input of the user or system administrator. In step 450 two factors are assigned based on the rendering intent: Cs for skill level, and Ct for task type. The values for Cs and Ct are commonly between 0 and 1, but they may be larger than 1 for certain applications. For new users Cs is usually set to a value smaller than that for the experienced users. The task factor Ct depends on the task types. Its value would be smaller if the rendering intent is to 'Provide a fun and comfortable experience' compared to 'Optimize detectability' or 'Maximize depth near the pointer' where having nearly the maximum perceived separation in distance may be beneficial to the user. In step 460 a value is assigned to the adaptive factor Ca. The factor Ca is intended to compensate for the dynamic nature of the viewing experience. For example, the user may experience stereoscopically induced visual fatigue during long viewing periods. This fatigue may be detected by sensor 80, and Ca would be set to a smaller value to preserve user comfort. The detection can take many forms. For example, it can be a recording of the change in blinking rate. It can also be a recording of the change in the pattern of eye gaze direction. In step 470 an Aim Range of Crossed Disparity (ARCD) and an Aim Range of Uncrossed Disparity (ARUD) are determined, as shown in equations 1 and 2. The convergence point corresponds to a location in the scene space where the horizontal disparity is zero.

$$ARCD = Cs*Ct*Ca*FRCD \tag{1}$$

$$ARUD = Cs*Ct*Ca*FRUD \tag{2}$$

Figure 6:
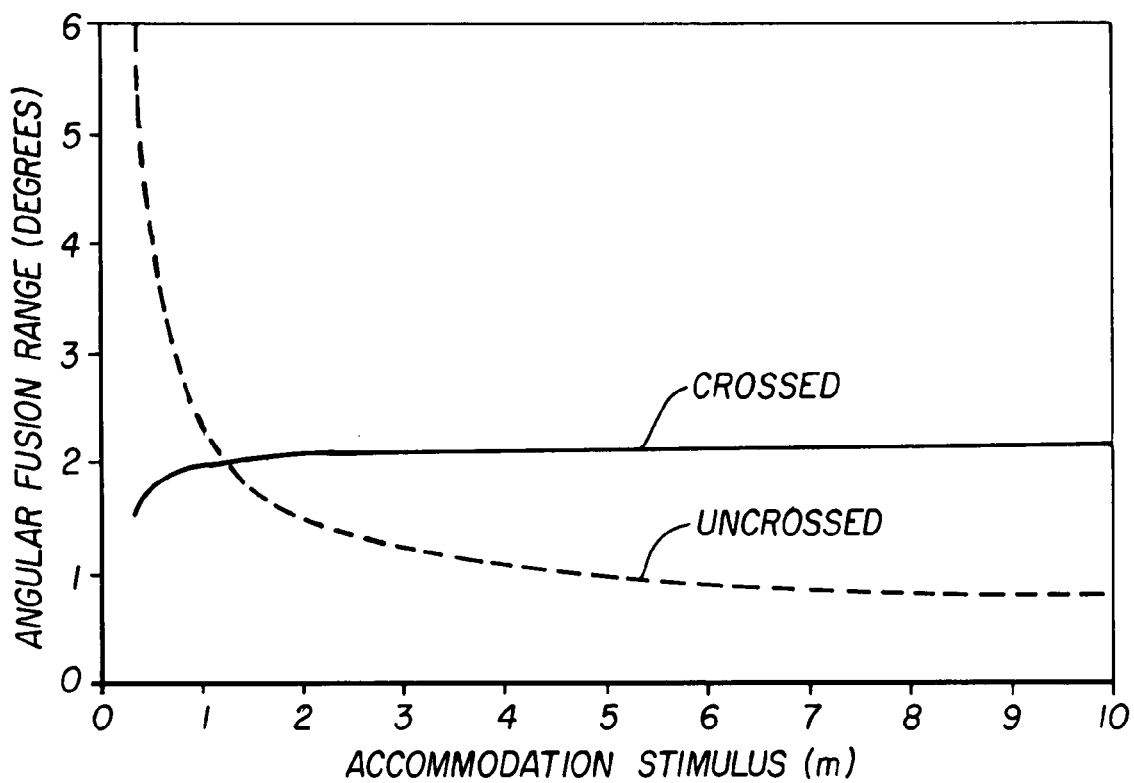
FIG. 6 is a graphical illustration of the default range of disparity as a function of the viewing distance.

FIG. 6 is a graphical illustration of how the default fusional ranges of crossed/uncrossed disparity may vary as a function of the viewing distance.

Figure 7:
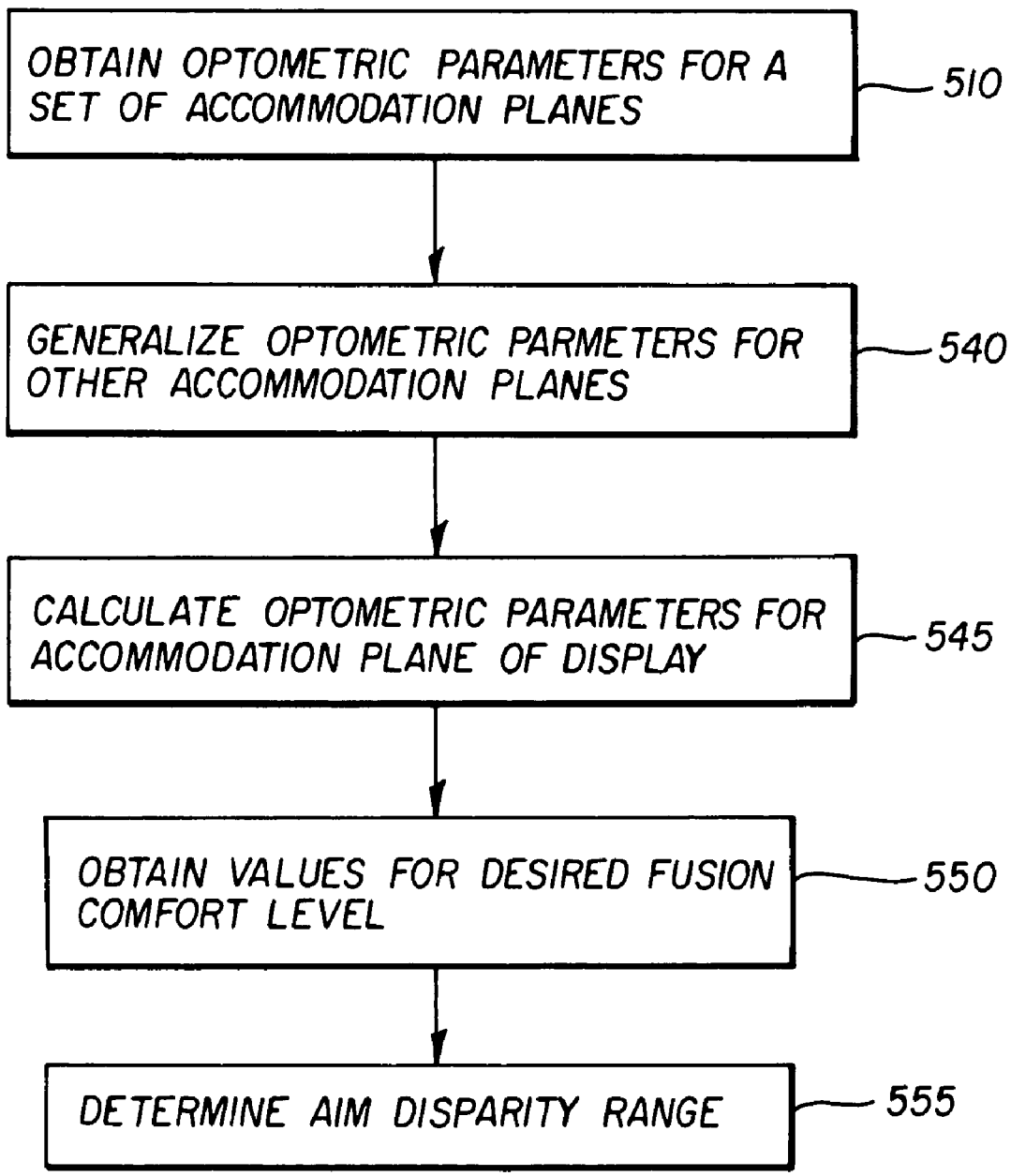
FIG. 7 is a flow chart showing the steps of a method to calculate the aim disparity range based on optometric data.

FIG. 7 shows a method of using optometric data to determine the aim disparity range. In step 510 the system obtains optometric data. This data may be obtained in many ways, including requiring the user to input this information using the input device 70. Other ways of obtaining this information may include obtaining this information from another networked or removable storage device where the file is linked to the user identifier. The optometric data may include but are not limited to the following parameters: interpupillary distance, dissociated phoria, fusional reserves.

Dissociated phoria is referred to as the amount by which the lines of sight of the eyes deviate from a corresponding fusion stimulus during monocular viewing. Fusional reserve is referred to as the amount of vergence, which is required to overcome disparity introduced by placing base-in (BI) or base-out (BO) lenses in front of a person's eyes. Phoria, base-in, and base-out fusional reserves are usually measured at near and distant accommodation planes.

In the preferred embodiment, the optometric data may include any or all of the following parameters:

| | |
|---|---|
| IPD | interpupillary distance |
| $d_{near}$ | Near accommodation plane for measuring data |
| $d_{distant}$ | Distant accommodation plane for measuring data |
| $P_{near}$ | Near phoria |
| $P_{distant}$ | Distant phoria |
| $BO_{near}$ | Near base-out fusional reserve |
| $BI_{near}$ | Near base-in fusional reserve |
| $BO_{distant}$ | Distant base-out fusional reserve |
| $BI_{distant}$ | Distant base-in fusional reserve |

An example of a user interface screen for providing optometric data is shown in FIG. 8. This user interface allows the user to enter their interpupillary distance 512, near accommodation plane for measuring data 514, the distant accommodation plane for measuring data 516, their near phoria 518, their distant phoria 520, their near base-out fusional reserve 522, their near base-in fusional reserve 524, their distant base-out fusional reserve 526 and their distant base-in fusional reserve 528. Once these values are entered, the user may dismiss this user interface button by pressing the 'OK' button 530. The optometric data are stored in the storage device for customization information 40.

Returning again to FIG. 7, several equations are shown for calculating the aim disparity range according to the exemplary steps shown in FIG. 7. In step 540 the optometric data measured for two accommodation planes are generalized for other accommodation planes. For this, one needs to convert the optometric data into common units (e.g., degrees of vergence angle, diopters) and calculate linear parameters describing phoria, BI and BO fusional reserve lines. The following formulas show how the slope (k) and intercept (c) of phoria, BO, and BI lines can be calculated in the case the data are converted into degrees of vergence angle:

$$k_{phoria} = \frac{\arctan\left(\frac{IPD}{2 \times d_{near}}\right) - \arctan\left(\frac{IPD}{2 \times d_{distant}}\right)}{P_{near} - P_{distant}} \quad (3)$$

$$c_{phoria} = \arctan\left(\frac{IPD}{2 \times d_{near}}\right) - k_{phoria} \times P_{near} \quad (4)$$

$$k_{BO} = \frac{\arctan\left(\frac{IPD}{2 \times d_{near}}\right) - \arctan\left(\frac{IPD}{2 \times d_{distant}}\right)}{BO_{near} - BO_{distant}} \quad (5)$$

$$c_{BO} = \arctan\left(\frac{IPD}{2 \times d_{near}}\right) - k_{BO} \times BO_{near} \quad (6)$$

$$k_{BI} = \frac{\arctan\left(\frac{IPD}{2 \times d_{near}}\right) - \arctan\left(\frac{IPD}{2 \times d_{distant}}\right)}{BI_{near} - BI_{distant}} \quad (7)$$

$$c_{BI} = \arctan\left(\frac{IPD}{2 \times d_{near}}\right) - k_{BI} \times BI_{near} \quad (8)$$

Note that the parameter arctan(IPD/2d) in Equations 3-8 represent vergence angle for a corresponding accommodation plane. More specifically, this parameter represents how much the eyes must converge from parallelism to fixate an object. It will be referred to as Convergence Demand, i.e., CD. The Convergence Demand for a given display accommodation distance will be referred to as $CD_{display}$.

The optometric data are calculated for the accommodation plane of the display $d_{display}$, which can be obtained from the storage device for display attributes 30.

$$P_{display} = \frac{CD_{display} - c_{phoria}}{k_{phoria}} \quad (9)$$

$$BO_{display} = \frac{CD_{display} - c_{BO}}{k_{BO}} \quad (10)$$

$$BI_{display} = \frac{CD_{display} - c_{BI}}{k_{BI}} \quad (11)$$

Based on values obtained in Equations 9-11 one can calculate in step 545 Phoria Demand ($PD_{display}$) and Fusional Reserve ($FR_{display}$) for the accommodation plane of the display $d_{display}$:

$$PD_{display} = P_{display} - CD_{display} \quad (12)$$

$$FR_{display}(\text{crossed}) = BO_{display} - CD_{display} \quad (13)$$

$$FR_{display}(\text{uncrossed}) = CD_{display} - BI_{display} \quad (14)$$

In step 550 a value for a desired Comfort Level, CL, is obtained. The comfort level can range from 0 (very uncomfortable) to 100 (very comfortable) and it depends on viewing task 200, which can be obtained from the storage for customization information 40. If the task 200 is to "provide fun and comfortable experience" then the comfort level could be high (e.g., 90), if the task is to "optimize detectability" then the comfort level could be moderate (e.g., 70).

In step 555 a fusion comfort range is calculated for both crossed and uncrossed conditions. For this, a corresponding Fusion Probability, FP, is calculated based on the comfort level, CL:

$$FP = k_{CL} \times CL - c_{CL} \quad (15)$$

where $k_{CL}$ and $c_{CL}$ are linear scaling constant. In experiments conducted by the authors it was found that the constant $k_{CL}=0.84$ and $c_{CL}=20.8$ provided good data fit (R2=0.95), and can be implemented in the preferred embodiment. Next, the fusion Comfort Range, CR, is calculated based on the following formula:

$$CR(\text{crossed}) = w_{reserves} \times FR(\text{crossed})_d + w_{phoria} \times P_d - \frac{\ln\left(\frac{1}{FP} - 1\right)}{b} \quad (16)$$

$$CR(\text{uncrossed}) = -w_{reserves} \times FR(\text{uncrossed})_d + w_{phoria} \times P_d - \frac{\ln\left(\frac{1}{FP} - 1\right)}{b} \quad (17)$$

where $w_{reserves}$ and $w_{phoria}$ are weighting parameters for correspondingly fusional reserves and phoria effects; b is a nonlinear parameter of a logistic function describing relationships between the fusional range and the fusional probability. According to authors' experimental data the values $w_{reserves}=0.3$; $w_{phoria}=1.0$; b=−5 can be used in Equations 16 and 17.

The obtained comfort ranges can be related to Aim Range of Crossed Disparity (ARCD) or Aim Range of Uncrossed Disparity (ARUD) using equations 18 and 19:

$$ARCD = 2 \times CR(\text{crossed}) \quad (18)$$

$$ARUD = 2 \times -CR(\text{uncrossed}) \quad (19)$$

Figure 9:
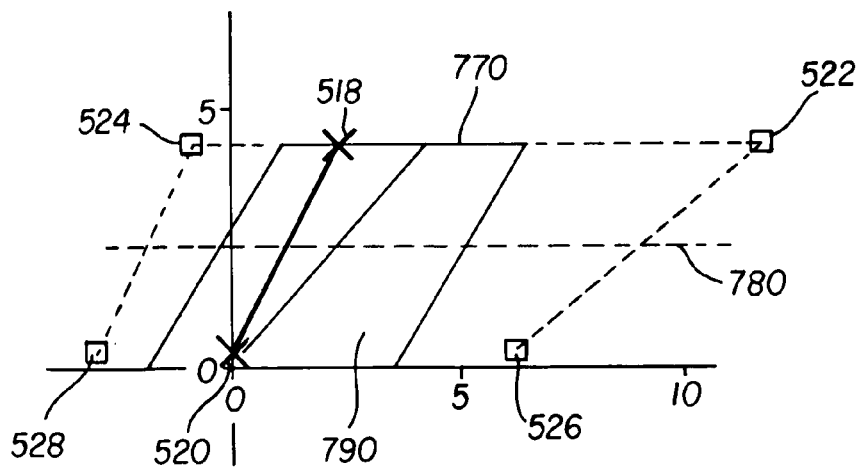
FIG. 9 is an illustration of a plot representing optometric data and the range of disparity that can be fused as a function of accommodation distance.

FIG. 9 shows an illustration plot representing the display accommodation plane 780 and optometric data: Near base-out fusional reserve 522, Near base-in fusional reserve 524, Distant base-out fusional reserve 526, Distant base-in fusional reserve 528, Near phoria 518, Distant phoria 520 and Equal convergence-accommodation demand line 770 are represented in this figure. Note that the shaded area 790 represents the range of disparities that one could reasonably expect a user to be able to fuse.

A method of obtaining the customization information and defining the aim disparity range has now been described. Referring to FIG. 2, the display attributes are obtained in step 110 from storage device for display attributes 30. The attributes include but are not limited to the following parameters: resolution, size of display, point of optical convergence, plane of accommodative focus, and display refresh rate.

The stereo images are obtained in step 120. For imagery scenes they can be pairs of images for left and right eye views. For computer graphics the 3-D model of the scenes and the rendering method (including camera separation and focal length) are obtained.

In step 130 a disparity map for a pair of images is obtained. For imagery, distance to each pixel may be recorded at the time of capture. If a stereo image pair has been captured without depth information, there are several existing methods in the prior art to obtain this disparity map, including object matching and phase correlation. For scenes that are generated using computer graphics, the disparity map can be obtained through analytical calculation, given the knowledge of scene 3-D model and the rendering method.

Figure 10:
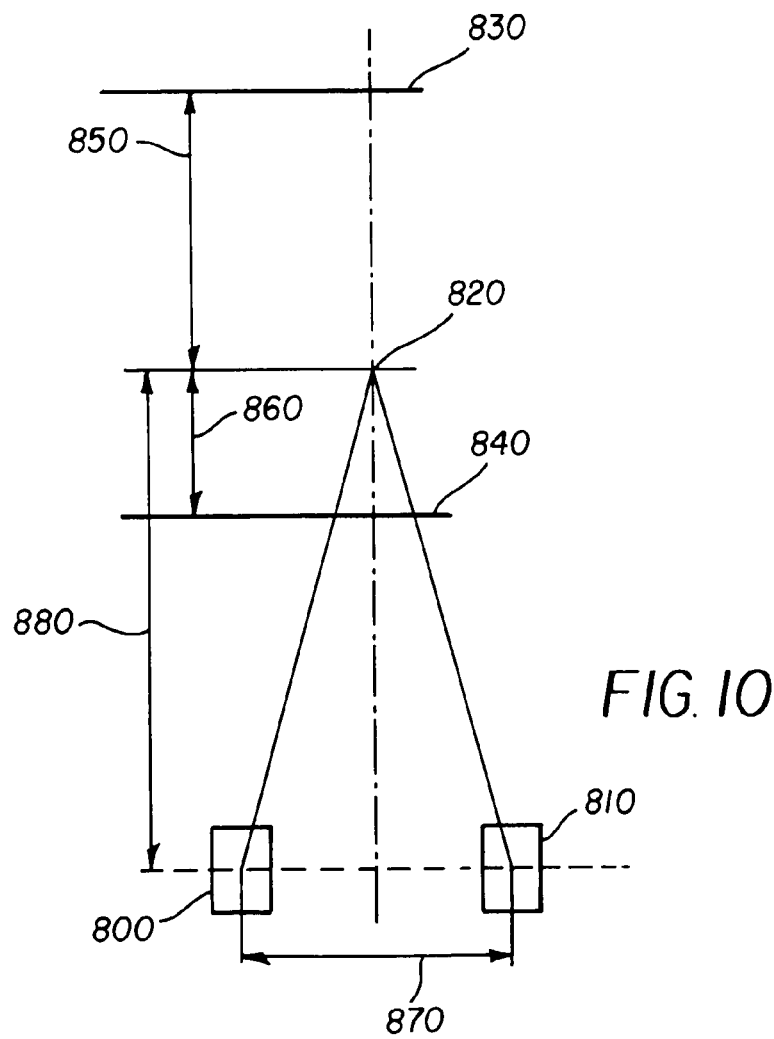
FIG. 10 shows the relationship of the spatial arrangement of the cameras, the scene depth range, and the corresponding scene disparity range.

FIG. 10 shows the relationship of the spatial arrangement of a pair of stereo cameras that may have been used to capture a real scene or that might have been simulated in a 3D graphical environment, the scene depth range, and the corresponding scene disparity range. Two cameras 800 and 810 are placed side by side with a separation distance 870. The converging point of the two cameras is at 820, which is away from the camera by a distance 880. The scene contains an object at the farthest distance 830 and another object at the closest distance 840. In the captured scenes, the convergence plane 820 has zero disparity. Between the camera and the convergence point is the Scene Range of Crossed Disparity 860 (SRCD). Between the convergence point and the farthest object in the scene is the Scene Range of Uncrossed Disparity 850 (SRUD).

Figure 11:
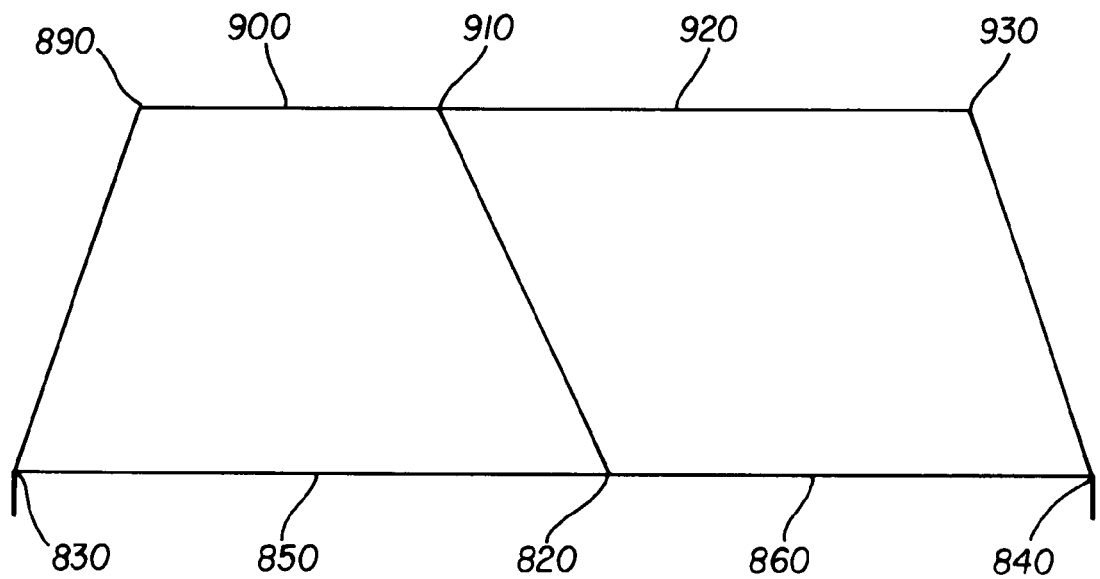
FIG. 11 shows an illustration of remapping between scene disparity and aim disparity range.

In step 140 a customized disparity map is generated. When images are input, this step will generally consist of redefining the convergence point, and remapping the scene disparity range based on the aim disparity range. FIG. 11 shows the remapping process. On the scene side there is the farthest object/maximum uncrossed disparity 830, convergence point/zero disparity 820, closest object/maximum crossed disparity 840, Scene Range of Uncrossed Disparity (SRUD) 850, and Scene Range of Crossed Disparity (SRCD) 860. On the aim side there are aim maximum uncrossed disparity 890, aim zero disparity/aim convergence point 910, aim maximum crossed disparity 930, Aim Range of Uncrossed Disparity (ARUD) 900, and Aim Range of Crossed Disparity (ARCD) 920. For this particular case, the overall scene disparity range (SRUD+SRCD) is larger than the aim disparity range (ARUD+ARCD), and the ratio of SRUD to SRCD is not equal to the ratio of ARUD to ARCD. The first step is to move the convergence point of the scene by x to fulfill the following requirement:

$$(SRUD-x)/(SRCD+x)=ARUD/AUCD \quad (20)$$

where x is a signed entity, and a positive value for x means that the convergence point is moved away from the cameras. SRCD, SRUD, ARUD, and ARCD are range values, and always have positive values.

Figure 12A:
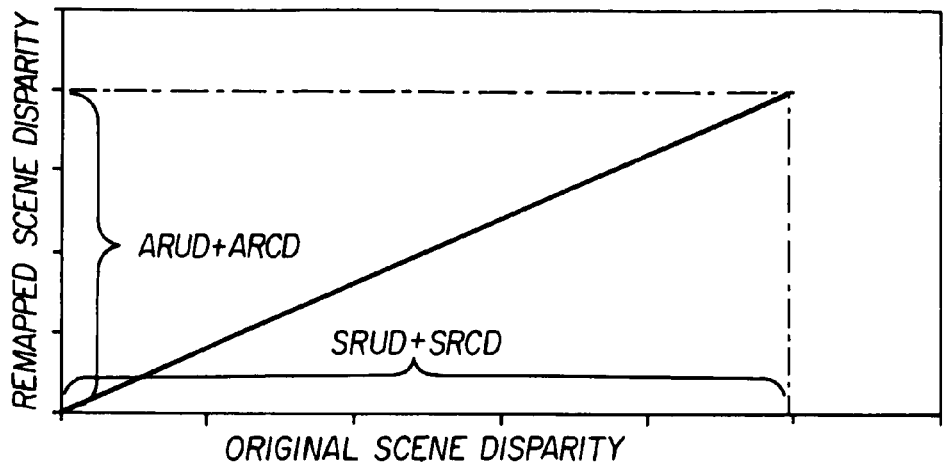
FIG. 12($a$) is a plot showing one method of performing the mapping from input disparity to output disparity that may be employed in the practice of the present invention.

The second step is to rescale the total range of scene disparity so that it matches the aim range of disparity. FIG. 12(a) shows an example of linear mapping. Here a scale factor K is calculated in equation 21:

$$K*(SRUD+SRCD)=ARUD+AUCD \quad (21)$$

The relationship of Remapped Scene Disparity (RSD) and the Original Scene Disparity (OSD), therefore, is:

$$RSD=K*(OSD-x) \quad (22)$$

where RSD, OSD and x are all signed entities. Positive values represent crossed disparity, and negative values uncrossed disparity. In the linear remapping the disparity is compressed equally throughout the disparity range, and there is no distortion of depth in the scene.

Figure 12B:
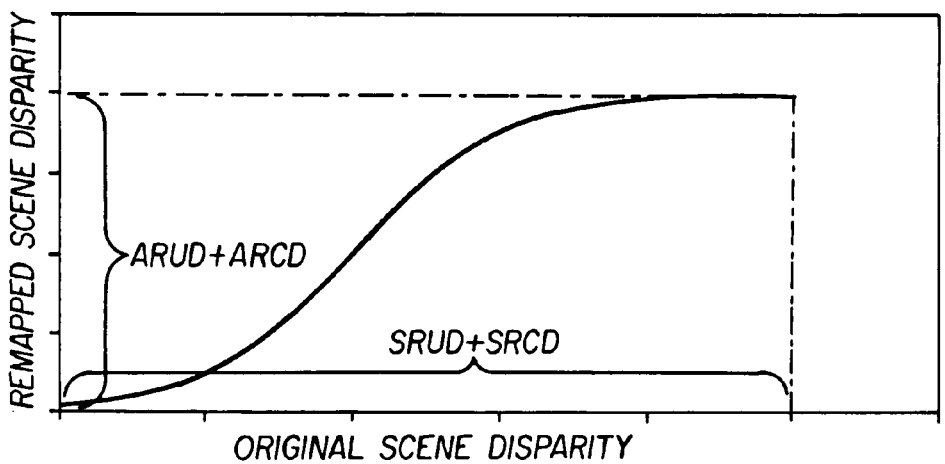
Figure 12C:
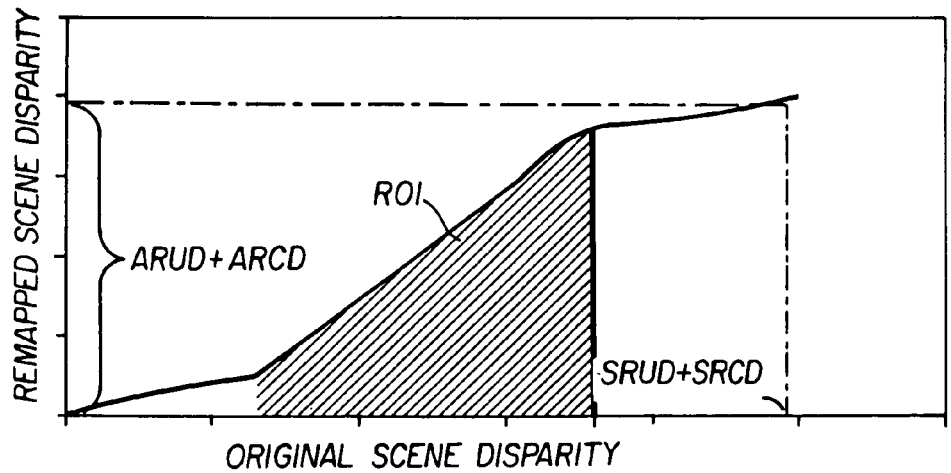

The remapping between Remapped Scene Disparity (RSD) and the Original Scene Disparity (OSD) can also take other forms. For example, it can be a nonlinear mapping, as shown in FIG. 12(b). It can also take into account the region of interest (ROI), as shown in FIG. 12(c).

In a computer graphics environment the step of generating a customized disparity map 140 may consist of the location, orientation, focal distance, magnification and depth of field characteristics of a pair of cameras that are used to emulate actual cameras as if they are capturing the scene. In this embodiment, the convergence point can most easily be modified by changing the location, orientation and focal distance of the cameras to provide a point where the two cameras are converged and focused to a point in space. The scene disparity range can then be modified by changing parameters such as the separation of the cameras or the magnification of the scene to increase or decrease disparities. Alternatively, the depth of field of the cameras may be adjusted to blur near or distant objects such that the human brain is unable to interpret the disparity information from these near or distant objects. Finally, it is possible to relocate objects within the scene, moving them closer to the convergence point to reduce disparities or to move them further from the convergence point to increase disparities. An example of this method is described in U.S. Pat. No. 6,175,379B1. Similar methods may be implemented in computer graphics cards such as the NVIDIA 3D stereo driver that was described earlier. In these systems, new rendering parameters may be determined that are loaded into registers within this video card to alter the rendering process as required.

This disparity remapping process described in steps 130, 135, and 140 may apply to a single stereo image pair, an entire computer graphics scene, or an entire video sequence of stereo image pairs.

After the customized disparity map is generated, stereo image pairs will either be rendered within systems employing computer graphic models or re-rendered for systems employing stereoscopic image data. In a system employing computer graphics, the convergence point and the disparity range may be used to establish rendering parameters for computer graphics systems.

In systems employing stereoscopic image information, the scene may be re-rendered to remap the disparities of objects in the left or right eye to match the aim disparity map. Various means for performing this mapping are known that either use information from one image to generate a second image or that use information from multiple image frames to generate a second image frame. For example, the remapping methods described in, WO2003000122A1 and U.S. Pat. No. 4,647,965, can be used in the present invention. In systems, employing computer graphics, stereo images may simply be rendered for display.

The remapping and re-rendering process in steps 135, 140 and 150 can be a dynamic process, and is dependent on the input from sensor 80. When the sensor 80 senses a new head position, it means that the viewing distance is changed. This would result in a change in the aim disparity range, as depicted in FIG. 9.

The final step of the method is to display the images in step 160. The images will be displayed using stereoscopic display device 60.

While this embodiment has been described to provide a customized rendering for each individual user, it is also possible to pre-render one or more scenes using the process described in FIG. 2 for a number of common user characteristics. Accordingly, a user is defined as both an individual user of the stereoscopic display and also as a cluster of individual users having common perceptual characteristics for stereoscopic viewing. One may also pre-select a few rendering parameters. In either case, the process applied in FIG. 5 can then be used to classify each user into a category for one of the selected groups by determining which of the pre-selected groups has a visual performance that most closely matched the users visual performance. Alternatively, the user may self classify themselves using even simpler means of indicating that they belong in a group such as indicating if they typically experience eye strain or headaches when using stereo displays. Further, under these conditions, the process applied in FIG. 5 can be simplified to include displaying a single scene or a series of scenes with similar depth information that have been rendered with different rendering parameters and then providing the user to select the image rendering that is the most useful or comfortable to view. Once this image is selected, the set of scenes with this same rendering may be presented to the user and/or all future images may be rendered using similar rendering parameters.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | image source |
| 20 | image processor |
| 30 | storage device for display attributes |
| 40 | storage device for customization information |
| 50 | rendering processor |
| 60 | stereoscopic display device |
| 100 | obtain customization information |
| 110 | obtain disparity attributes |
| 120 | obtain images/3D graphics |
| 130 | obtain scene disparity map |
| 135 | determine aim disparity |
| 140 | generate customized disparity map |
| 150 | re-render scene |
| 160 | display images |
| 210 | optimize delectability |
| 212 | provide a fun and comfortable experience |
| 214 | maximize depth near the pointer |
| 216 | new user |
| 218 | experienced user |
| 300 | background |
| 310 | slider marker |
| 320 | slider bar |
| 330 | test stimulus |
| 340 | done |
| 400 | obtain user identifier |
| 410 | has user profile |
| 420 | retrieve user profile |
| 430 | create user profile |
| 440 | obtain rendering intent |
| 450 | assign values to Cs and Ct |
| 460 | assign values to Ca |
| 470 | calculate aim disparity range |
| 510 | obtain optometric parameters for a set of accommodation planes |
| 540 | generalize optometric parameters for other accommodation planes |
| 545 | calculate optometric parameters for accommodation planes of display |
| 550 | obtain values for desired fusion comfort level |
| 555 | determine aim disparity range |
| 512 | interpupillary distance |
| 514 | near testing distance |
| 516 | distant testing distance |

PARTS LIST

| | |
|---|---|
| 518 | near phoria |
| 520 | distant phoria |
| 522 | near base-out fusional reserve |
| 524 | near base-in fusional reserve |
| 526 | distant base-out fusional reserve |
| 528 | distant base-in fusional reserve |
| 770 | equal convergence-accommodation demand line |
| 780 | display accommodation plane |
| 790 | range of disparities for comfortable fusing |
| 800 | left camera |
| 810 | right camera |
| 820 | convergence point/zero disparity |
| 830 | farthest object/maximum uncrossed disparity |
| 840 | closest object/maximum crossed disparity |
| 850 | scene range of uncrossed disparity (SRUD) |
| 860 | scene range of crossed disparity (SRCD) |
| 870 | camera separation distance |
| 880 | distance between camera and convergence point |
| 890 | aim maximum uncrossed disparity |
| 900 | aim range of uncrossed disparity (ARUD) |
| 910 | aim zero disparity/aim convergence point |
| 920 | aim range of crossed disparity (ARCD) |
| 930 | aim maximum crossed disparity |

What is claimed is:

1. A method for producing pairs of stereo images customized for individual users from an input stereoscopic image, comprising the steps of a) obtaining customization information including a first stereoscopic disparity range for a first individual user, wherein the stereoscopic disparity range for the first individual user is the range of disparities in a stereoscopic image that the first individual user can comfortably fuse, and corresponds to a range of apparent depths in the stereoscopic image that the first individual user can comfortably view;

b) obtaining a scene disparity map for the input stereoscopic image, wherein the input stereoscopic image includes at least one of a given pair of stereo images or a given three-dimensional (3D) computer graphic model;

c) determining a first aim disparity range for a first customized pair of stereo images responsive to the first stereoscopic image disparity range for the first individual user and the obtained scene disparity map;

d) at least one of generating a first customized disparity map responsive to the first aim disparity range for the first individual user or generating first customized rendering conditions for a first three-dimensional (3D) computer graphic model responsive to the first aim disparity range for the first individual user;

e) using a digital image processor to produce a first customized pair of stereo images for subsequent display by using the first customized disparity map or the first customized rendering conditions for the first three-dimensional (3D) computer graphic model;

f) displaying the first customized pair of stereo images to the first individual user on a stereoscopic display device;

g) obtaining customization information including a second stereoscopic disparity range for a second individual user, wherein the second stereoscopic disparity range for the second individual user is the range of disparities in a stereoscopic image that the second individual user can comfortably fuse, and corresponds to a range of apparent depths in the stereoscopic image that the second individual user can comfortably view, the second stereoscopic disparity range being different from the first stereoscopic disparity range;

h) determining a second aim disparity range for a second customized pair of stereo images responsive to the second stereoscopic image disparity range for the second individual user and the obtained scene disparity map;

i) at least one of generating a second customized disparity map responsive to the second aim disparity range for the second individual user or generating second customized rendering conditions for a second three-dimensional (3D) computer graphic model responsive to the second aim disparity range for the second individual user;

j) using a digital image processor to produce a second customized pair of stereo images for subsequent display by using the second customized disparity map or the second customized rendering conditions for the second three-dimensional (3D) computer graphic model, wherein the second customized pair of stereo images are different from the first customized pair of stereo images; and k) displaying the second customized pair of stereo images to the second individual user on a stereoscopic display device.

2. The method claimed in claim 1, wherein the step of obtaining the scene disparity map includes obtaining a scene convergence point and depth information from the 3D computer graphics model.

3. The method claimed in claim 1, wherein the step of generating the first customized disparity map or the second customized disparity map includes applying a predetermined mapping function to modify the scene disparity map.

4. The method claimed in claim 3, wherein the predetermined mapping function is dependent on a region of interest.

5. The method claimed in claim 4, wherein the region of interest is dynamic.

6. The method claimed in claim 1, wherein the step of generating the first customized disparity map or the second customized disparity map is accomplished by applying a linear transformation to the corresponding first scene disparity map or second scene disparity map.

7. The method claimed in claim 1, wherein the step of generating the first customized disparity map or the second customized disparity map is accomplished by applying a non-linear transformation to the corresponding first scene disparity map or second scene disparity map.

8. The method claimed in claim 4 wherein the region of interest is based upon a measurement of fixation position.

9. The method claimed in claim 4, wherein the region of interest is based upon a map of probable fixations.

10. The method claimed in claim 1, wherein the step of generating the first customized rendering conditions or the second customized rendering conditions includes computing a location, an orientation, a focal distance, a magnification and a depth of field correlating to a pair of simulated cameras.

11. The method claimed in claim 1, wherein the first customized rendering conditions or the second customized rendering conditions are generated by modifying one or more of a set of correlating camera parameters including camera location, orientation, focal distance, magnification or depth of field.

12. The method of claim 1 wherein the stereoscopic disparity range for the first individual user or the second individual user is characterized by a user-specific crossed disparity upper limit and a user-specific uncrossed disparity upper limit, and wherein the crossed disparity upper limit corresponds to the image disparity for the closest apparent object distance that can be comfortably viewed by the individual user in a stereoscopic image viewed on the stereoscopic display device, and the user-specific uncrossed disparity upper limit corresponds to the image disparity for the farthest apparent object distance that can be comfortably viewed by the individual user in a stereoscopic image viewed on the stereoscopic display device.

13. The method claimed in claim 1, wherein the customization information for the first individual user or the second individual user further includes at least one of a user profile or a rendering intent subject to a predetermined task choice or skill level.

14. A stereoscopic display system customized for an individual user's perceptual characteristics for stereoscopic viewing, comprising:

a) a stereoscopic image source that provides different stereoscopic images for each of a plurality of user categories, each user category corresponding to a cluster of users having common perceptual characteristics for stereoscopic viewing and being characterized by a category-specific stereoscopic disparity range limit, the stereoscopic disparity range limit being the range of disparities in a stereoscopic image that the cluster of users can comfortably fuse, wherein the stereoscopic images for each user category are rendered according to the corresponding category-specific stereoscopic disparity range;

b) a stereoscopic display device; and c) a data processor for
associating a first individual user with a first one of the plurality of user categories according to the individual user's perceptual characteristics for stereoscopic viewing;
associating a second individual user with a second one of the plurality of user categories according to the individual user's perceptual characteristics for stereoscopic viewing;
receiving first and second stereoscopic images from the stereoscopic image source corresponding to the associated first and second user categories;
displaying the first received stereoscopic image on the stereoscopic display device for the first user; and
displaying second received stereoscopic image on the stereoscopic display device for the second user.

15. The stereoscopic display system of claim 14 wherein the first or second individual user is associated with one of the plurality of user categories by characterizing the individual users's perceptual characteristics for stereoscopic viewing and determining the user category that most closely matches the user's perceptual characteristics for stereoscopic viewing.

* * * * *